US012736141B2

(12) United States Patent
Ma et al.

(10) Patent No.: US 12,736,141 B2
(45) Date of Patent: Sep. 15, 2026

(54) VALVE CORE AND WATER OUTLET APPARATUS

(71) Applicant: XIAMEN LOTA INTERNATIONAL CO., LTD., Xiamen (CN)

(72) Inventors: Qingshui Ma, Xiamen (CN); Huosheng Zhan, Xiamen (CN); Weiwei Chen, Xiamen (CN); Yumin Cui, Xiamen (CN); Chuanbao Zhu, Xiamen (CN)

(73) Assignee: XIAMEN LOTA INTERNATIONAL CO., LTD., Xiamen (CN)

( * ) Notice: Subject to any disclaimer, the term of this patent is extended or adjusted under 35 U.S.C. 154(b) by 105 days.

(21) Appl. No.: 18/757,512

(22) Filed: Jun. 28, 2024

(65) Prior Publication Data

US 2025/0354617 A1 Nov. 20, 2025

(30) Foreign Application Priority Data

May 14, 2024 (CN) ......................... 202410596239.3

(51) Int. Cl.
*F16K 11/078* (2006.01)
*F16K 11/074* (2006.01)

(52) U.S. Cl.
CPC ....... *F16K 11/0787* (2013.01); *F16K 11/0743* (2013.01); *Y10T 137/86823* (2015.04)

(58) Field of Classification Search
CPC ..................... F16K 11/0743; Y10T 137/86823
See application file for complete search history.

(56) References Cited

U.S. PATENT DOCUMENTS

| | | | | |
|---|---|---|---|---|
| 3,633,621 A * | 1/1972 | Myers | F16K 11/0743 | 251/297 |
| 4,423,752 A * | 1/1984 | Psarouthakis | F16K 11/072 | 251/288 |
| 5,806,552 A * | 9/1998 | Martin, Jr. | F16K 11/0782 | 137/270 |
| 6,123,105 A * | 9/2000 | Yang | F16K 11/0743 | 137/270 |
| 6,192,935 B1 * | 2/2001 | Schroeder | F16K 11/083 | 137/312 |
| 6,805,151 B1 * | 10/2004 | Chang | F16K 27/045 | 137/270 |
| 11,781,661 B1 * | 10/2023 | Zhang | F16K 11/056 | 137/625 |
| 2005/0126648 A1 * | 6/2005 | Vu | F16K 11/0743 | 137/625.41 |

(Continued)

*Primary Examiner* — Robert K Arundale

(57) ABSTRACT

A valve core capable of directly connecting to water hoses and a water outlet apparatus are provided. The valve core includes a valve body. A water control assembly is disposed in the valve body. At least one water inlet mounting hole is defined on the valve body, the at least one water inlet mounting hole is communicated with the water control assembly and is configured to directly connect with a corresponding water inlet hose in the water hoses. A first circular hole section is disposed on the at least one water inlet mounting hole for achieving sealing connection with the corresponding water inlet hose. a limiting structure is disposed on an outer side of the valve body, the limiting structure is configured to limit the valve body to rotating in a water outlet apparatus when the valve core is mounted in the water outlet apparatus.

14 Claims, 7 Drawing Sheets

(56) References Cited

U.S. PATENT DOCUMENTS

| | | | | |
|---|---|---|---|---|
| 2006/0042705 | A1* | 3/2006 | Chang | F16K 27/045 137/637.3 |
| 2012/0018020 | A1* | 1/2012 | Moore | E03C 1/0403 137/801 |
| 2013/0199645 | A1* | 8/2013 | Hsu | E03C 1/04 137/801 |
| 2015/0144214 | A1* | 5/2015 | Chang | F16K 27/045 137/625.41 |
| 2016/0017578 | A1* | 1/2016 | Chang | E03C 1/04 137/315.09 |

* cited by examiner

VALVE CORE AND WATER OUTLET APPARATUS

TECHNICAL FIELD

The present disclosure relates to a technical field of valve cores, and in particular to a valve core capable of directly connecting to water hoses and a water outlet apparatus.

BACKGROUND

Currently, most of valve cores in the market require sealing components between ends surfaces thereof and faucet main bodies or between outer circumferential surfaces thereof and the faucet main bodies to ensure airtight, and are then connected to water inlet hoses and water outlet hoses. Since the water inlet hoses and the water outlet hoses are connected to the faucet main bodies and are not directly connected to the valve cores, there is a need to provide the sealing components on lower end surfaces of the valve cores and the outer circumferential surfaces of the valve cores for ensuring the airtight. On one hand, structures of such valve cores are relatively complex, so that production and assembly costs are increased, on the other hand, the sealing components are easily squeezed in an assembly process of the valve cores, so that the sealing components are easily damaged and water leakage may be caused.

SUMMARY

The present disclosure provides a valve core capable of directly connecting to water hoses, which is simple in structure and convenient in operation, so as to solve above problems.

The present disclosure provides following solutions.

The present disclosure provides the valve core capable of directly connecting to the water hoses, including a valve body. A water control assembly is disposed in the valve body. At least one water inlet mounting hole is defined on the valve body, the at least one water inlet mounting hole is communicated with the water control assembly and is configured to directly connect with a corresponding water inlet hose in the water hoses. A first circular hole section is disposed on the at least one water inlet mounting hole for achieving sealing connection with the corresponding water inlet hose. a limiting structure is disposed on an outer side of the valve body, the limiting structure is configured to limit the valve body to rotating in a water outlet apparatus when the valve core is mounted in the water outlet apparatus.

Furthermore, the limiting structure is a limiting spline, or a limiting block, or a limiting rib.

Furthermore, a height of the limiting structure is 0.5-3.5 mm.

Furthermore, an axial positioning structure is further disposed on the outer side of the valve body for limiting the valve body to axially moving in the water outlet apparatus when the valve core is mounted in the water outlet apparatus.

Furthermore, the axial positioning structure is a positioning shaft shoulder disposed on an outer peripheral side of the valve body.

Furthermore, two water inlet mounting holes and a water outlet mounting hole are defined on a bottom of the valve body, two first circular hole sections are provided, and the two circular hole sections are respectively disposed on the two water inlet mounting holes for respectively connecting the two water inlet mounting holes to the corresponding water inlet hose in the water hoses.

Furthermore, a boss having openings is disposed on a lower portion of the valve body, and opening directions of the openings of the boss are perpendicular to a central axis direction of the valve body.

Furthermore, a valve housing is disposed on the valve body, the valve housing is connected to the valve body for fixing the water control assembly.

Furthermore, a connecting position of the valve body and the valve housing falls on any position in an axial direction of the valve body.

The present disclosure further provides a water outlet apparatus, and the valve core as foregoing is mounted in the water outlet apparatus.

Compared with the prior art, beneficial effects of the present disclosure are as follows.

The present disclosure provides the at least one water inlet mounting hole and the water outlet mounting hole for connecting with the corresponding water inlet hose on the valve body, so that when the valve core is mounted in a main body of the water outlet apparatus, the corresponding water inlet hose is directly connecting into the at least one water inlet mounting hole and a water outlet hose is directly connecting into the water outlet mounting hole, thereby directly connecting the at least one water inlet hose and the water outlet hose with the valve body, the corresponding water inlet hose and the water outlet hose have no need to connect with a bottom end surface of the valve core through an end surface of the main body of the water outlet apparatus, so that sealing components for ensuring airtight are not required to provide between the bottom end surface of the valve core and the main body of the water outlet apparatus and are also not required to provide on a peripheral side of the valve core, which simplifies assembly manners of the valve core and the water hoses and further has a good leakage-proof effect.

DETAILED DESCRIPTION OF EMBODIMENTS

As shown in FIGS. 1-7, embodiments of the present disclosure provide a water outlet apparatus, including a valve core capable of directly connecting to water hoses. The valve core capable of directly connecting to the water hoses includes a valve body 1. A water control assembly 3 is disposed in the valve body 1, the water control assembly 3 includes at least one water inlet, at least one water inlet mounting hole 11 is defined on the valve body 1, the at least one water inlet mounting hole 11 is communicated with the at least one water inlet and is configured to directly connect with a corresponding water inlet hose in the water hoses.

Figure 1:
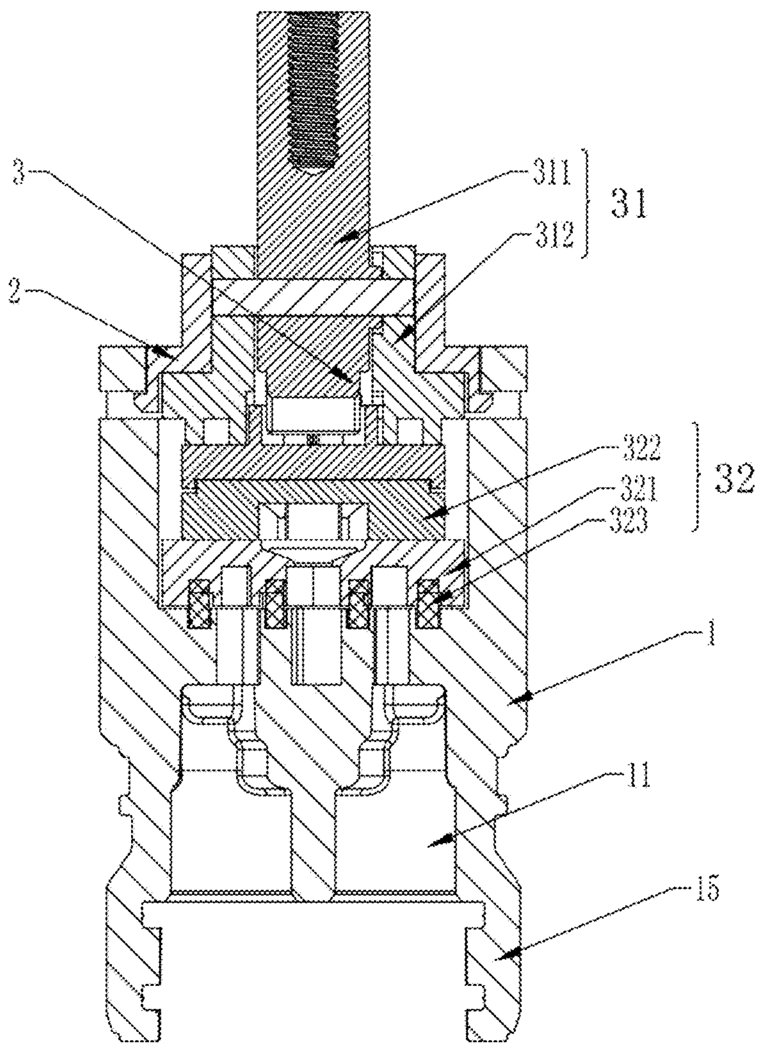
FIG. 1 is a cross-sectional structural schematic diagram of a valve core capable of directly connecting to water hoses according to one embodiment of the present disclosure.
Figure 2:
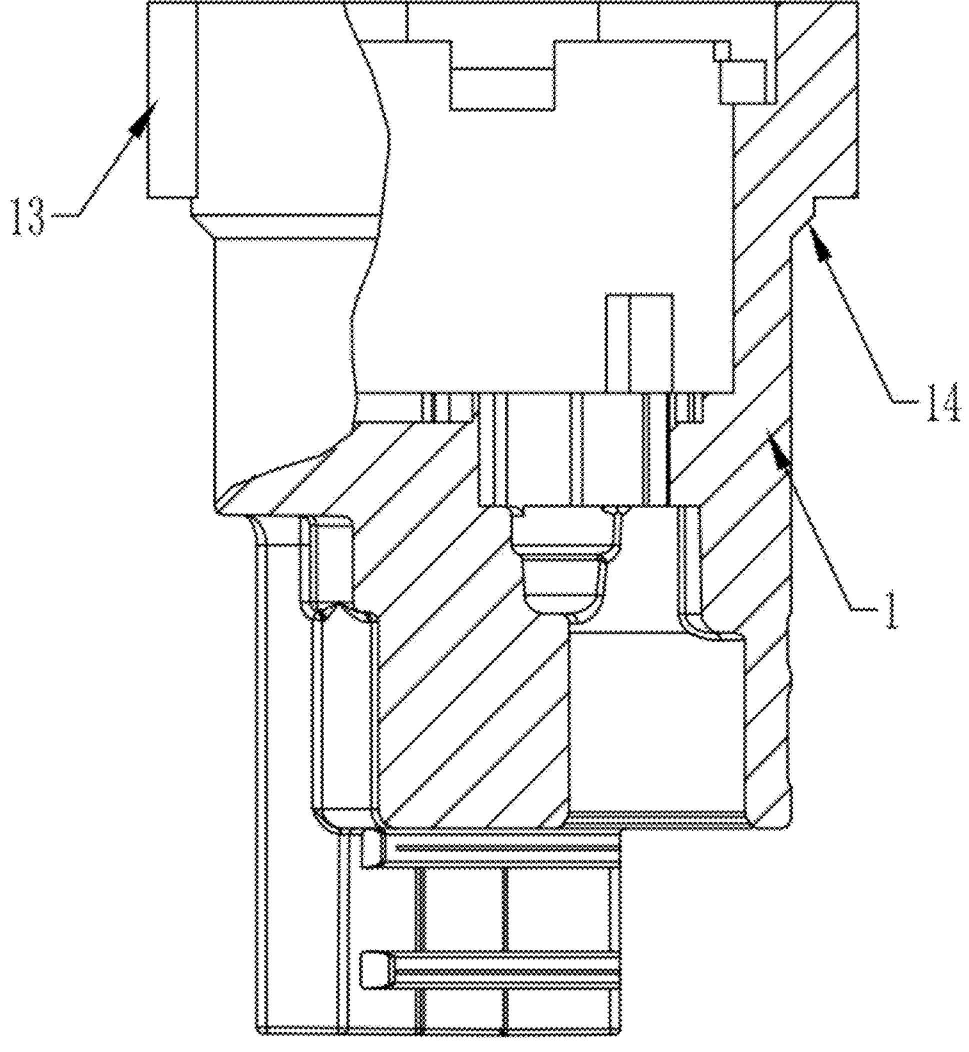
FIG. 2 is a cross-sectional structural schematic diagram of a valve body of the valve core capable of directly connecting to the water hoses according to one embodiment of the present disclosure.
Figure 3:
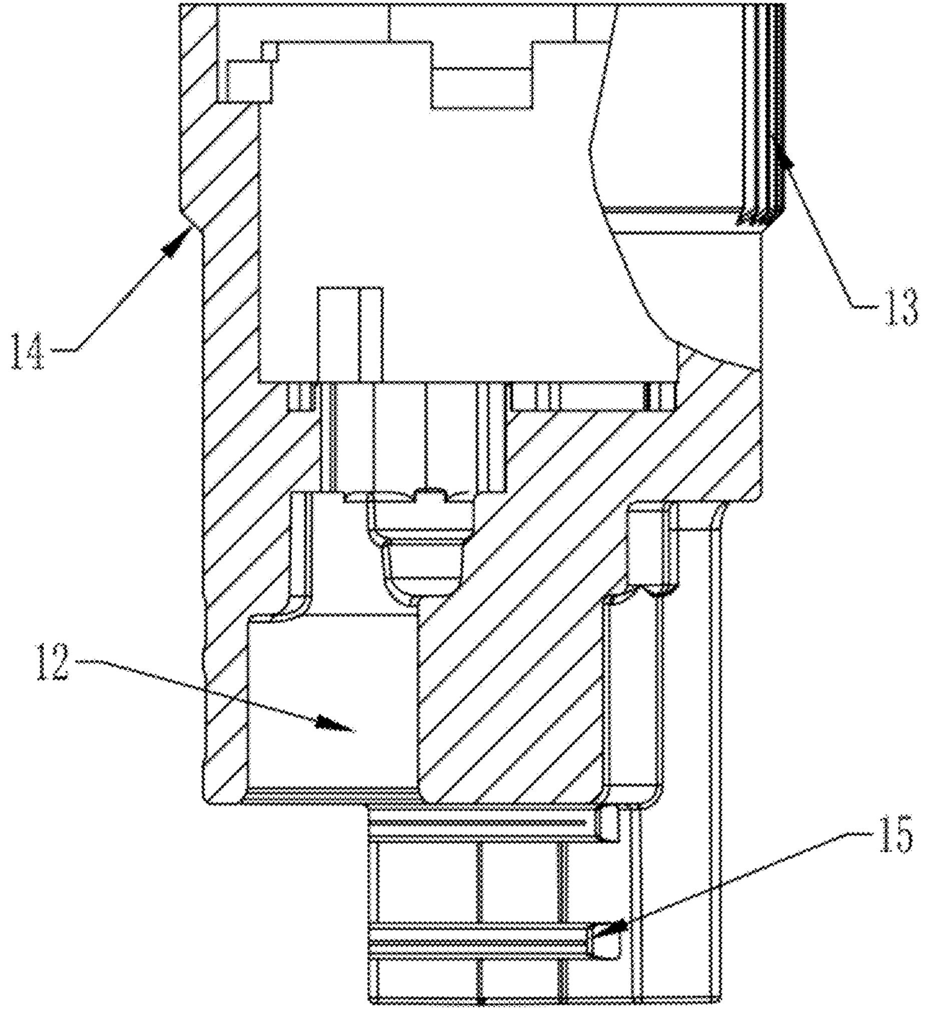
FIG. 3 is another cross-sectional structural schematic diagram of the valve body of the valve core capable of directly connecting to the water hoses according to one embodiment of the present disclosure.
Figure 4:
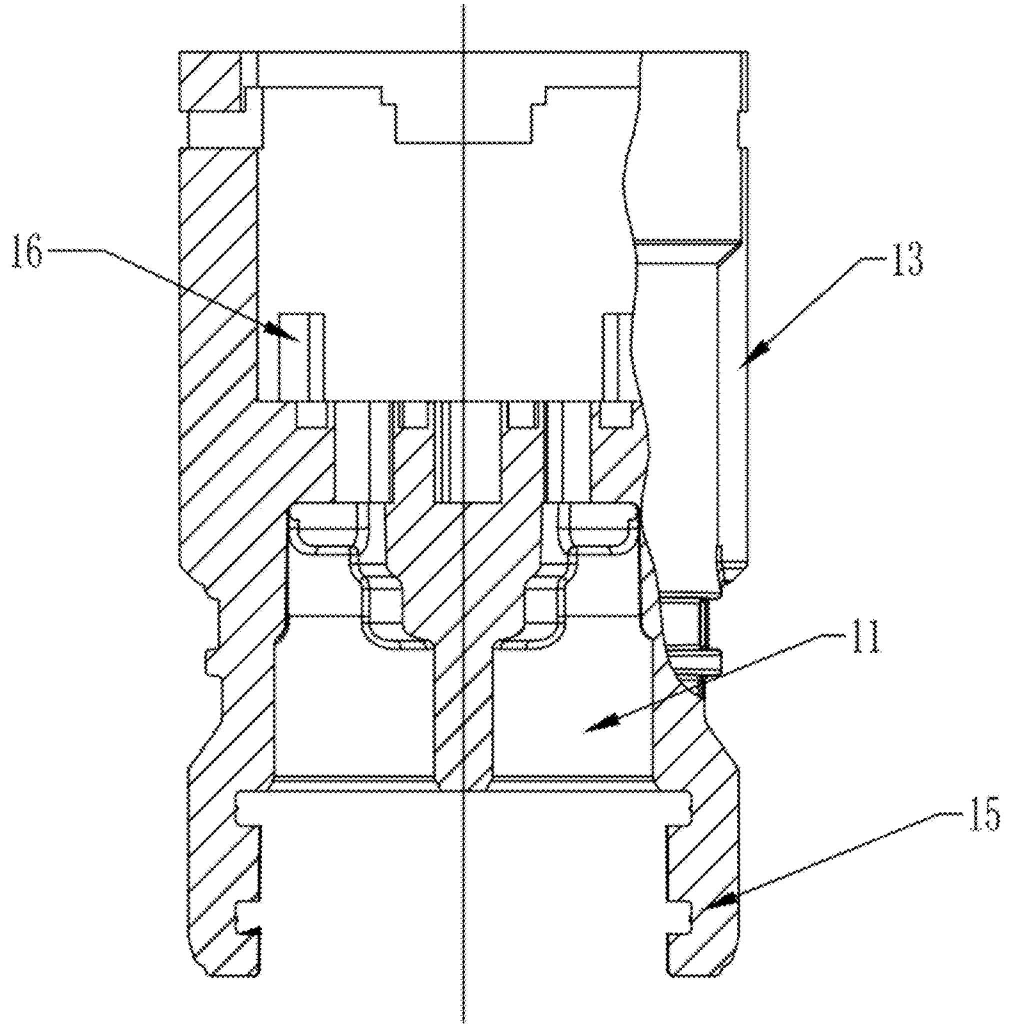
FIG. 4 is a cross-sectional schematic diagram of the valve body of the valve core capable of directly connecting to the water hoses having a limiting structure according to one embodiment of the present disclosure.
Figure 5:
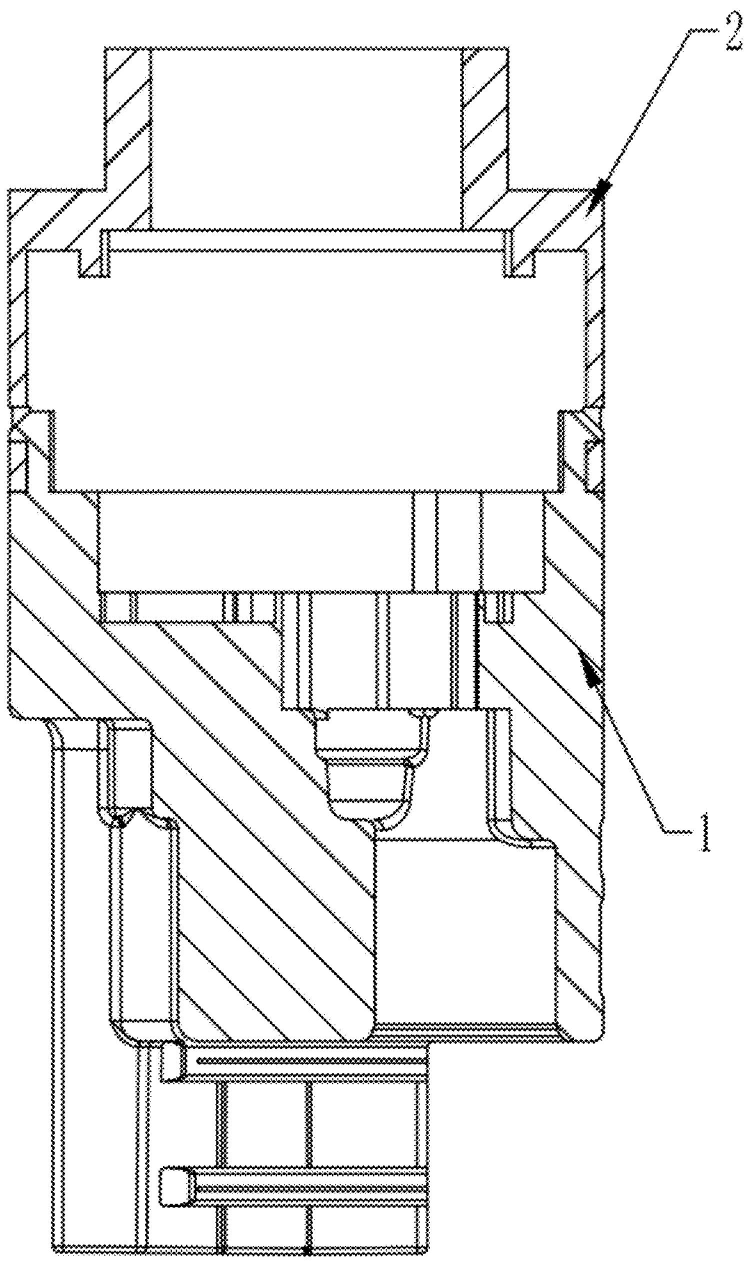
FIG. 5 is a cross-sectional structural schematic diagram of the valve body of the valve core capable of directly connecting to the water hoses being connected to a valve housing thereof through snap-fit according to one embodiment of the present disclosure.
Figure 6:
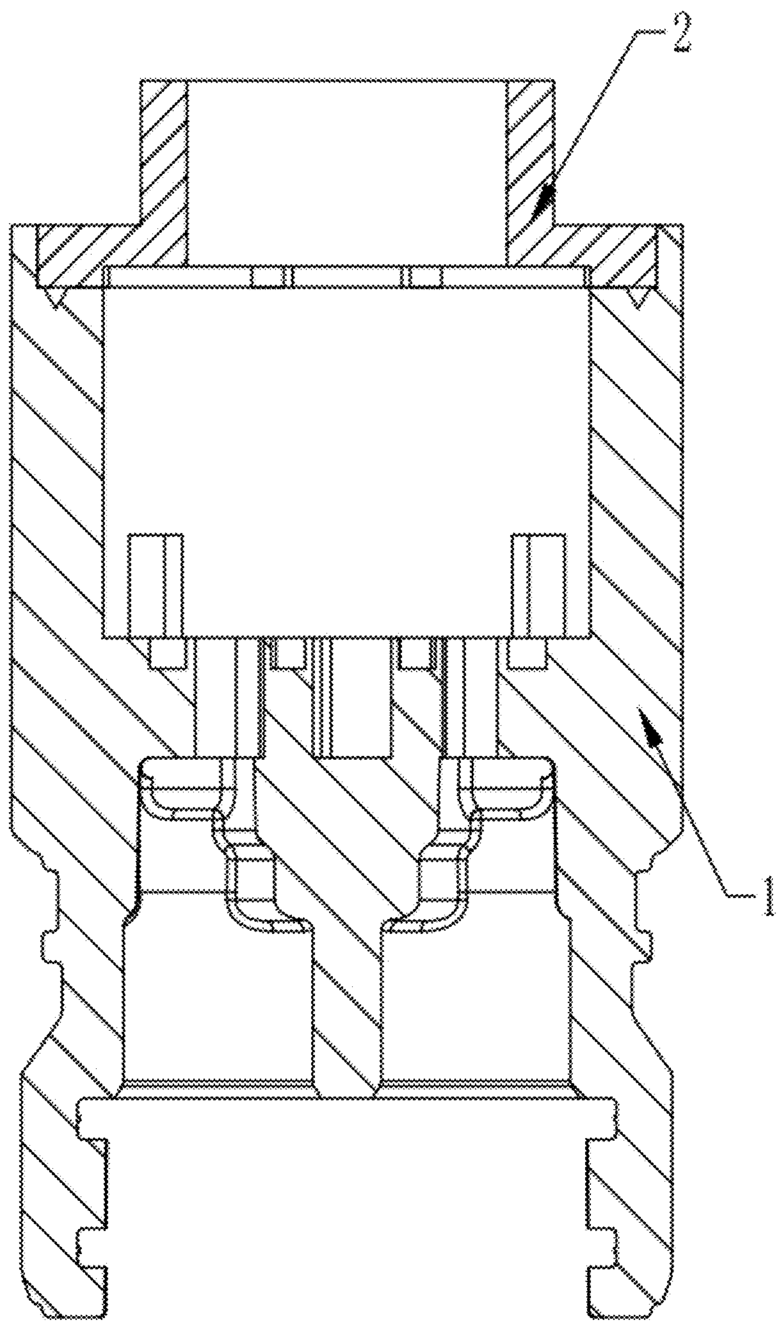
FIG. 6 is another cross-sectional structural schematic diagram of the valve body of the valve core capable of directly connecting to the water hoses being connected to a valve housing thereof through welding according to one embodiment of the present disclosure.
Figure 7:
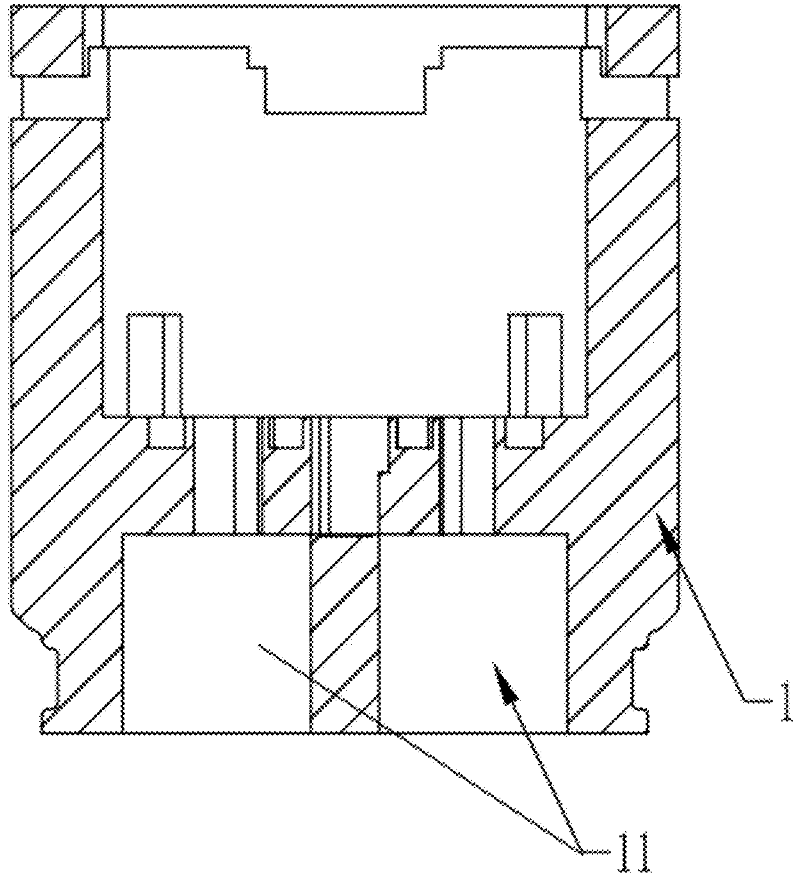
FIG. 7 is another cross-sectional structural schematic diagram of the valve body of the valve core capable of directly connecting to the water hoses without a boss according to one embodiment of the present disclosure Reference numerals in the drawings: 1. valve body; 11. water inlet mounting hole; 12. water outlet mounting hole; 13. limiting structure; 14. axial positioning structure; 15. boss; 16. positioning protrusion; 2. valve housing; 3. water control assembly; 31. operation device; 311. control rod; 312. control rod base; 32. water admixing device; 321. fixed sheet; 322. movable sheet; 323. sealing component.

Please refer to FIG. 1, in the embodiment, the water control assembly 3 includes an operation device 31 and a water admixing device 32, and the operation device 31 is configured to control the water admixing device 32 to perform water admixing. Certainly, in other embodiments, when there is only one water inlet hose, the water admixing device 32 may be replaced with an open-placed assembly. A valve housing 2 is disposed on the valve body 1, the valve housing 2 is connected to the valve body 1 for fixing the water control assembly 3. A connecting position of the valve body 1 and the valve housing 2 falls on any position in an axial direction of the valve body 1. The valve body 1 and the valve housing 2 may also be connected in different manners, such as a snap-fit manner, a welding manner, etc., and it is preferable to use the snap-fit manner to facilitate disassembly of the valve body 1 and the valve housing 2.

In some embodiments, the operation device 31 includes a control rod 311, a control rod base 312, etc., the water admixing device 32 includes a movable sheet 322 and a fixed sheet 321, the fixed sheet 321 is fixed on the valve body 1, and a sealing component 323 is disposed between the fixed sheet 321 and the valve body 1 for sealing. The control rod 311 is connected to the movable sheet 322 for controlling the movable sheet 322 to move on the fixed sheet 321, thereby achieving on-off control and water admixing control. Positioning protrusions 16 are disposed in the valve body 1 and are configured to fix the fixed sheet 321, the at least one water inlet and a water outlet are defined on the valve body 1, and the at least one water inlet and the water outlet are communicated with at least one water inlet and a water outlet on the fixed sheet 321. In the embodiment, the fixed sheet 321 and the movable sheet 322 are made of ceramic sheets. It should be noted that a structure of the water control assembly 3 is not limited herein.

In the embodiment, the at least one water inlet mounting hole 11 is defined on a bottom of the valve body 1 and is communicated with the water inlet, so as to guide water in the corresponding water inlet hose into the water inlet. One or two or even more water inlet mounting holes are provided; the at least one water inlet mounting hole 11 extends downward to form the circular hole section disposed along an axis, the circular hole section is configured to mount the corresponding water inlet hose in the water hoses, the circular hole section is provided with a sealing connection with the water inlet hose through a first sealing ring, and a sealing ring is disposed between the circular hole section and the water inlet hose for sealing, In another embodiment, a water outlet mounting hole 12 is further defined on the bottom of the valve body 1 for connecting to the water outlet, thereby directly inserting the water outlet hose into the water outlet mounting hole 12. A second sealing ring is further disposed on a side of the water inlet hose for sealingly connecting to the water inlet mounting hole 11. When the water outlet hose is provided, a third sealing ring is further disposed on the side of the water outlet hose for connecting, thereby ensuring airtight at a connecting portion. Since the water inlet hose and the water outlet hose are directly connected and fixed on the valve body 1, a leakage risk is avoided to be caused between the valve body 1 and a main body of the water outlet apparatus. Also, since the water outlet hose is directly mounted on the valve body 1, the leakage risk is also avoided between the valve body 1 and an inner wall of the main body of the water outlet apparatus, in this way, there is no need to provide sealing components between the water inlet hose and the valve body 1 and between the water outlet hose and the valve body 1.

As shown in FIGS. 2-5, in one embodiment, in one embodiment, a limiting structure 13 is disposed on an outer side of the valve body 1, the limiting structure 13 is configured to limit the valve body 1 to rotating in the water outlet apparatus when the valve core is mounted in the water outlet apparatus. Specifically, the limiting structure 13 is a limiting spline, or a limiting block, or a limiting rib, or other structures capable of limiting rotation of the valve body 1. The limiting structure 13 is disposed on the outer side of the valve body 1, and is capable matching with a valve core limiting structure disposed in a valve core mounting groove of the water outlet apparatus, so as to prevent the valve body 1 from rotating, a height of the limiting structure 13 is 0.5-3.5 mm, if the height of the limiting structure 13 is too short, breaking may be cause; if the height of the limiting structure 13 is too long, pressure for matching may be large. Furthermore, an axial positioning structure 14 is further disposed on the outer side of the valve body 1 for limiting the valve body 1 to axially moving in the water outlet apparatus when the valve core is mounted in the water outlet apparatus, the axial positioning structure 14 is a positioning shaft shoulder disposed on an outer peripheral side of the valve body 1. Since the axial positioning structure 14 is matched with the limiting structure 13, the valve core may not be rotated or shaken up and down. In this way, even though connection between an end of the valve core and an end of the water outlet apparatus are removed, stability of the valve core in the water outlet apparatus is ensured.

As shown in FIGS. 1-6, as an improvement, in one embodiment, a boss 15 having openings is disposed on a lower portion of the valve body 1, and opening directions of the openings of the boss 15 are perpendicular to a central axis direction of the valve body 1. A fixing piece for fixing the water inlet hose and the water outlet hose is disposed on the boss 15 having the openings, meanwhile, the boss 15 having the openings is further configured to match with a structure of the water outlet apparatus for positioning and guiding. Certainly, in other embodiments, the boss is not provided.

In the embodiment, the water inlet hose and the water outlet hose are selected from a hose assembly, and a sealing ring is disposed at an end of the hose assembly for sealing a connection portion between the water inlet hose and the water inlet mounting hole 11 or between the water outlet hose and the water outlet mounting hole 12

It should be noted that the water outlet apparatus is a device having a water outlet function, such as a faucet or a shower device.

According to the embodiment, distinguished from conventional valve cores, there is no need to provide a sealing component between an end surface of the valve core of the present disclosure and the main body of the water outlet apparatus and between a peripheral side surface of the valve core and the main body of the water outlet apparatus. Moreover, the valve core also had advantages of being simple in structure and few in components.

It should be understood that the above are only preferred embodiments of the present disclosure, a protection scope of the present disclosure is not limited to the above embodiments, and all technical solutions under a concept of the present disclosure shall fall within the protection scope of the present disclosure.

Accompanying drawings used in the above embodiments only illustrate some embodiments of the present disclosure and should not be regarded as limiting the protection scope of the present disclosure, and for those who skilled in the art, other related drawings may be obtained according to the accompany drawings without creative efforts.

What is claimed is:

1. A valve core, configured to directly connect to water hoses, comprising:

a unitary, integrally formed valve body;

wherein a water control assembly is disposed in the valve body; at least one water inlet mounting hole is integrally defined in the valve body and is in communication with the water control assembly and is configured to directly connect to a corresponding water inlet hose in the water hoses; the at least one water inlet mounting hole comprises a circular hole configured for achieving a sealing connection with the corresponding water inlet hose; a limiting structure is disposed on an outer side of the valve body and is configured to limit the valve body to rotating in a water outlet apparatus when the valve core is mounted in the water outlet apparatus;

wherein when the valve core is installed in the water outlet apparatus, the corresponding water inlet hose is directly inserted into the at least one water inlet mounting hole defined in the valve body thereby realizing direct connection of the corresponding water inlet hose to the valve body without requiring connection via an end face of a body of the water outlet apparatus to a bottom end face of the valve core, such that no sealing member is required between the bottom end face of the valve core and the body of the water outlet apparatus, and no sealing member is required on a peripheral side of the valve core, thereby simplifying an installation method of the valve core and the hoses and providing a leak-proof effect;

wherein there is further disposed an axial positioning structure on the outer side of the valve body for limiting the valve body from axially moving in the water outlet apparatus when the valve core is mounted in the water outlet apparatus;

wherein the axial positioning structure is an annular positioning shoulder protruding radially outward from an outer peripheral side of the valve body.

2. The valve core according to claim 1, wherein the limiting structure is a limiting spline, or a limiting block, or a limiting rib.

3. The valve core according to claim 2, wherein a height of the limiting structure is 0.5-3.5 mm.

4. The valve core according to claim 1, wherein the at least one water inlet mounting hole comprises two water inlet mounting holes defined on a bottom of the valve body, and wherein the valve core further comprises a water outlet mounting hole defined on the bottom of the valve body;

wherein two said circular hole sections are respectively disposed on the two water inlet mounting holes for respectively connecting the two water inlet mounting holes to two corresponding water inlet hoses.

5. The valve core according to claim 1, wherein a boss having an opening is disposed on a lower portion of the valve body, and wherein the two water inlet mounting holes are formed through the opening of the boss, an opening direction of the opening of the boss being perpendicular to a central axis direction of the valve body, the boss being configured to mount a fixing piece for securing the corresponding water inlet hose.

6. The valve core according to claim 1, wherein a valve housing is disposed on the valve body, the valve housing is connected to the valve body for fixing the water control assembly.

7. The valve core according to claim 6, wherein the valve housing is connected to the valve body at a selectable position along an axial direction of the valve body.

8. A water outlet apparatus, comprising:

a valve core disposed therein and configured to directly connect to water hoses;

wherein the valve core comprises a unitary, integrally formed valve body; a water control assembly is disposed in the valve body; at least one water inlet mounting hole is integrally defined in the valve body and is in communication with the water control assembly and is configured to directly connect to a corresponding water inlet hose in the water hoses; the at least one water inlet mounting hole comprises a circular hole configured for achieving a sealing connection with the corresponding water inlet hose; a limiting structure is disposed on an outer side of the valve body and is configured to limit the valve body to rotating in the water outlet apparatus;

wherein when the valve core is installed in the water outlet apparatus, the corresponding water inlet hose is directly inserted into the at least one water inlet mounting hole define din the valve body thereby realizing direct connection of the corresponding water inlet hose to the valve body without requiring connection via an end face of a body of the water outlet apparatus to a bottom end face of the valve core, such that no sealing member is required between the bottom end face of the valve core and the body of the water;

wherein there is further disposed an axial positioning structure on the outer side of the valve body for limiting the valve body from axially moving in the water outlet apparatus when the valve core is mounted in the water outlet apparatus;

wherein the axial positioning structure is an annular positioning shoulder protruding radially outward from an outer peripheral side of the valve body.

9. The valve core according to claim 1, wherein the at least one water inlet mounting hole extends downward to form a circular hole section disposed along an axis thereof, the circular hole section being configured for mounting the corresponding water inlet hose, and wherein a first sealing ring is disposed at an end of the corresponding water inlet hose and between the circular hole section and the corresponding water inlet hose to achieve the sealing connection.

10. The valve core according to claim 9, wherein the corresponding water inlet hose comprises a second sealing ring disposed on a side portion thereof, the second sealing ring being configured to sealingly engage with the at least one water inlet mounting hole.

11. The valve core according to claim 9, further comprising a water outlet mounting hole defined in a bottom of the valve body, the water outlet mounting hole being in communication with a water outlet of the water control assembly and being configured to directly connect to a corresponding water outlet hose in the water hoses; wherein the water outlet hose further comprises a third sealing ring disposed at a side portion of the water outlet hose, the third sealing ring being configured to sealingly engage with the water outlet hose.

12. The valve core according to claim 6, wherein the valve housing is detachably connected to the valve body by a snap-fit engagement.

13. The valve core according to claim 1, wherein the water control assembly comprises an operation device and a water mixing device, the operation device being configured to control the water mixing device to mix water.

14. The valve core according to claim 13, wherein the water mixing device comprises a fixed ceramic sheet and a movable ceramic sheet, the movable ceramic sheet being operable to move relative to the fixed ceramic sheet to control water flow and mixing ratio.

* * * * *